(12) United States Patent
Patrick et al.

(10) Patent No.: US 7,596,190 B2
(45) Date of Patent: Sep. 29, 2009

(54) SYSTEM, METHOD, AND APPARATUS FOR CORRECTION OF CODE DOPPLER SHIFT

(75) Inventors: Christopher Patrick, San Diego, CA (US); Douglas Rowitch, Del Mar, CA (US); Pillappakkam Srinivas, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 570 days.

(21) Appl. No.: 10/404,715

(22) Filed: Mar. 31, 2003

(65) Prior Publication Data
US 2006/0121915 A1    Jun. 8, 2006

Related U.S. Application Data

(60) Provisional application No. 60/369,406, filed on Apr. 1, 2002.

(51) Int. Cl.
*H04L 27/00* (2006.01)
*H03K 9/00* (2006.01)

(52) U.S. Cl. .................. 375/326; 375/316; 375/344; 375/346; 375/350

(58) Field of Classification Search ........... 375/130, 375/140–146, 147, 148, 150, 152, 343, 316, 375/344, 346, 350, 326
See application file for complete search history.

(56) References Cited

U.S. PATENT DOCUMENTS

| 5,809,064 A | * | 9/1998 | Fenton et al. ............... 375/150 |
| 5,822,363 A | * | 10/1998 | Le Roy ....................... 375/143 |
| 5,955,986 A | * | 9/1999 | Sullivan ................. 342/357.05 |
| 6,289,041 B1 | | 9/2001 | Krasner ...................... 375/152 |
| 6,304,216 B1 | * | 10/2001 | Gronemeyer ............... 342/378 |
| 6,731,672 B1 | * | 5/2004 | Eschenbach ................ 375/140 |
| 6,850,557 B1 | * | 2/2005 | Gronemeyer ............... 375/150 |
| 6,909,738 B2 | * | 6/2005 | Akopian et al. ............. 375/142 |
| 2002/0105458 A1 | * | 8/2002 | Dooley et al. .......... 342/357.05 |
| 2002/0181626 A1 | * | 12/2002 | Sung .......................... 375/347 |
| 2003/0050949 A1 | * | 3/2003 | Van Wechel et al. ........ 708/622 |

FOREIGN PATENT DOCUMENTS

WO        0033471        7/2000

* cited by examiner

*Primary Examiner*—Jason M. Perilla
(74) *Attorney, Agent, or Firm*—Charles D. Brown; Linda G. Gunderson

(57) ABSTRACT

A method of signal reception according to one embodiment of the invention includes compensating for an estimated or measured Doppler shift during integration of a correlated signal. Such a method also includes determining a composite peak position and correcting this position based on the compensation.

38 Claims, 12 Drawing Sheets

SYSTEM, METHOD, AND APPARATUS FOR CORRECTION OF CODE DOPPLER SHIFT

RELATED APPLICATIONS

This application claims priority to U.S. Provisional Application No. 60/369,406, filed Apr. 1, 2002.

BACKGROUND

1. Field of the Invention

This invention relates to wireless communications, and more specifically to correction of shifts that occur due to Doppler effects imposed on transmitted signals.

2. Background Information

Many applications for wireless communications include obtaining timing and/or positional information from a received signal. Such applications may include locating and tracking a particular feature or pattern in a received signal over time. In one example, a base station tracks a signal received from a mobile telephone to determine the telephone's relative velocity. In another example, a receiver calculates its position by identifying delays in signals received from satellites in a global positioning satellite (GPS) system.

In a direct sequence spread spectrum (DSS) technique, a data signal is spread with a pseudo-noise (PN) code sequence before being modulated onto a carrier. In a GPS system, one such code sequence is called a coarse acquisition (C/A) code. When the received signal is correlated with the same code sequence, a correlation peak is obtained. The location in time of the correlation peak provides information regarding the propagation delay of the signal. This propagation delay information may be used to determine the relative distance between the transmitter and the receiver.

It may be desired to integrate correlation results over time, whether coherently and/or noncoherently. For example, an individual correlation result may be too weak to distinguish from background noise. Accordingly, integration over time may be employed to improve the signal-to-noise ratio (SNR).

Relative motion between a transmitter and a receiver causes a Doppler shift in the received signal. One effect of a Doppler shift is to cause the spreading code sequence in the received signal to drift over time. When correlating a Doppler-shifted signal over time, the correlation peak becomes distorted. The distortion typically appears as a spreading of the correlation peak as compared to the correlation peak resulting from correlation of a non-shifted copy of the signal. Such distortion may reduce the signal-to-noise ratio (SNR) of the correlation peak. This can be understood by recognizing that the amount of energy in the peak is the same whether distorted or not. However, in the distorted peak, the amount of energy is more spread out. In addition, this distortion or spreading of the peak may reduce the accuracy to which the location in time of the correlation peak may be determined.

SUMMARY

A method according to one embodiment of the invention includes correlating a received signal with a predetermined code sequence and integrating the results of the correlation. As a result of integrating a Doppler shifted signal over time, the output of the integration includes one or more applied shifts (e.g. based on an estimated Doppler time shift). The method further includes (A) determining a location of a feature in the result of the integrating and (B) applying a correction based upon the applied shifts to the determined location of the feature.

BRIEF DESCRIPTION OF THE DRAWINGS

The appended figures are illustrative only and are not intended to accurately depict particular features or to indicate particular scale relationships.

DETAILED DESCRIPTION

Figure 1:
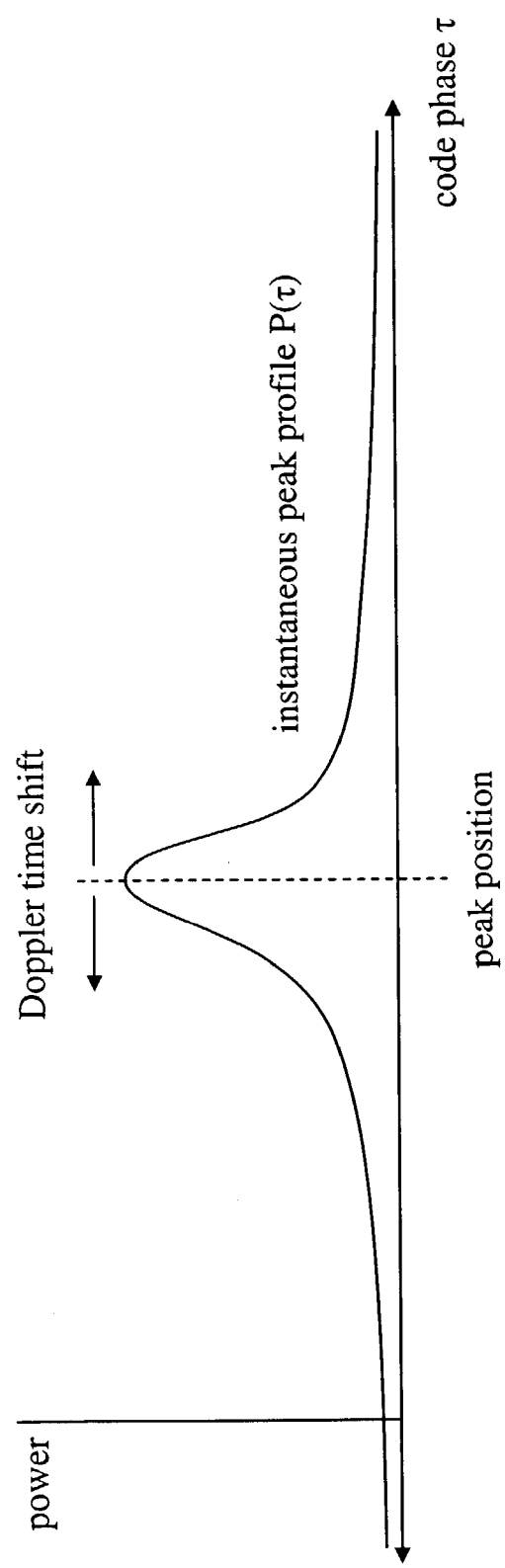
FIG. 1 illustrates an effect of Doppler time shift on instantaneous peak position.

FIG. 1 shows an instantaneous peak profile $P(\tau)$ of a received signal as a function of code phase $\tau$. In a case where the signal is spread using a PN code sequence, such a peak may be obtained by correlating the received signal with the code sequence. When the code phase of the code sequence with which the received signal was spread is synchronized with the code phase of the code sequence that is used to despread the received signal, the correlator outputs a relatively high output signal. The relatively high output from the correlator indicates that the code phase of the two code sequences are the same. The "code phase", $\tau$ represents the relationship between the code sequence used to despread the received signal and an arbitrary reference point. If the transmitter and receiver remain stationary with respect to each other, the location of the peak in code phase $\tau$ may be expected to remain constant (e.g. ignoring changes in the environment).

As the distance between the transmitter and receiver changes, the resulting Doppler shift causes the location (i.e., code phase $\tau$) of the peak to change. The direction of movement of the peak depends upon whether the distance between the transmitter and receiver is becoming smaller or larger. The magnitude of the movement of the peak is directly proportional to the relative velocity of the transmitter with respect to the receiver (ignoring environmental effects such as reflections).

Figure 2:
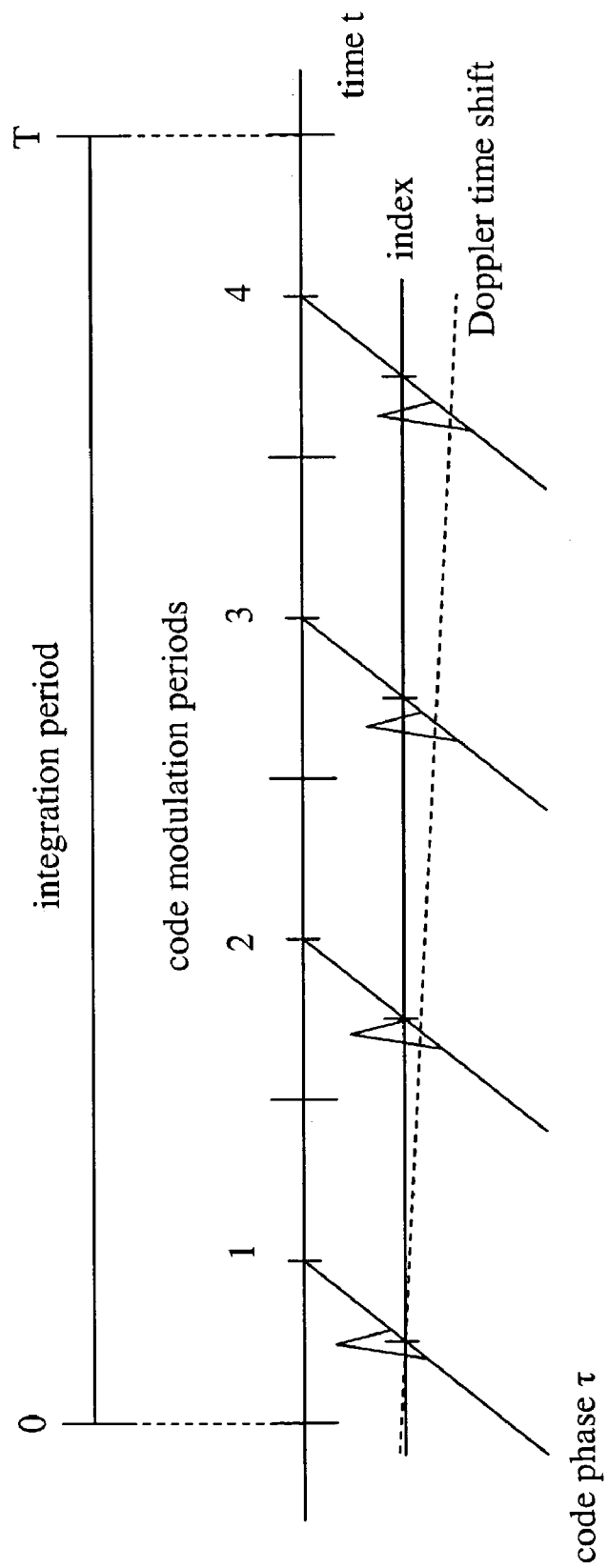
FIG. 2 illustrates an example of movement of a peak of a received signal over consecutive code modulation periods.

FIG. 2 shows an example of how the location of a peak (in code phase $\tau$) may change over time t. In this example, time t is marked in units of code modulation periods (the amount of time required for the code sequence to run from the beginning to the end and start from the beginning once more). In the case of a GPS application, the code modulation period is equal to approximately 832.5 microseconds=1023 (number of values in the code sequence)/1.2288 MHz (the modulation frequency). In many applications, the same predetermined code sequence is used during each code modulation period, although different code sequences may also be used.

As discussed above, relative motion between a transmitter and a receiver may cause a Doppler shift in the received signal. In the example of FIG. 2, the distance between the transmitter and the receiver is decreasing at a constant rate (i.e. constant at least with respect to the time period being observed), and the resulting Doppler shift causes the peaks to appear closer together.

Figure 3:
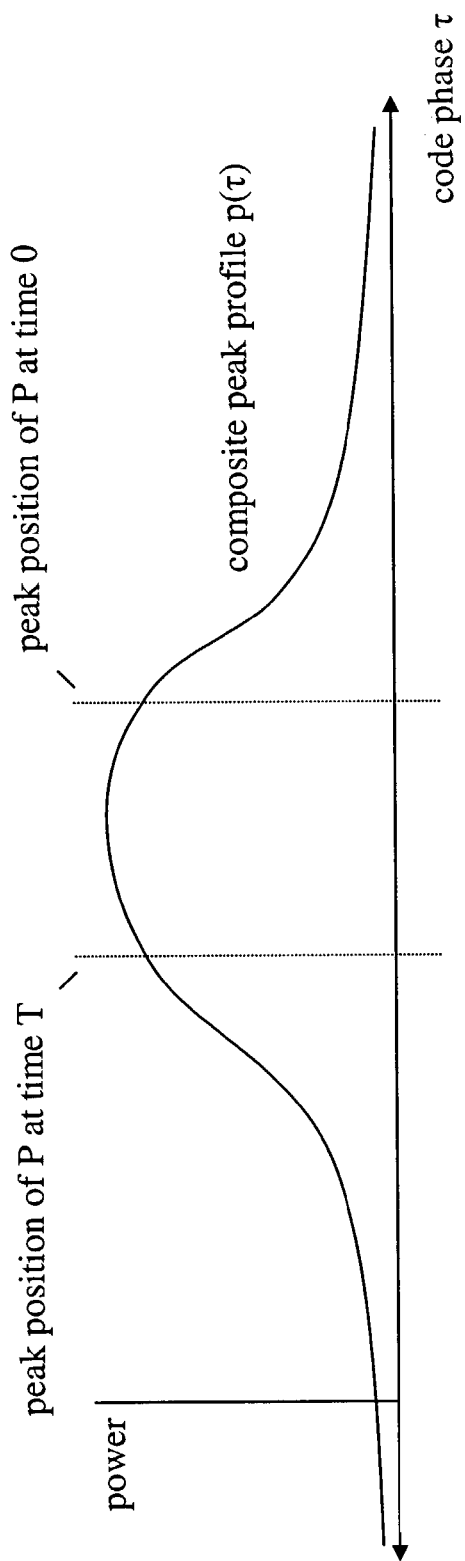
FIG. 3 illustrates a composite peak profile.

FIG. 3 shows an example of a composite peak profile $P(\tau)$ as a function of code phase $\tau$. Such a profile may be obtained by correlating the received signal and integrating over an integration period T. The integration period T may have any length from a part of a code modulation period up to many code modulation periods. In this example, coherent integration is assumed, although results from several coherent integrations may also be combined non-coherently into a single result.

If the peak is integrated over several code modulation periods, drift due to the Doppler shift may cause the composite peak to spread over time rather than accumulating to increase SNR. It may be difficult to localize a spread peak, such that accuracy may be decreased. Spreading may reduce the height (e.g. power) of the composite peak. The position of the peak may also be shifted in code phase space. The shift of the composite peak in code phase can be approximated by the time average of the position of the instantaneous peak of the signal.

It may be desirable to combine the correlation results into a composite result. One possible advantage to such combination is to increase the effective observed SNR. In one example, a composite result is obtained by summing individual correlation results (e.g. as obtained over corresponding code modulation periods). In other applications, the various constituent correlation results may be weighted differently and/or subtracted from one another. One may see that as the Doppler shift causes the peaks to drift with respect to one another, a peak of the composite result may not have a single clearly defined location in code phase space.

Figure 4:
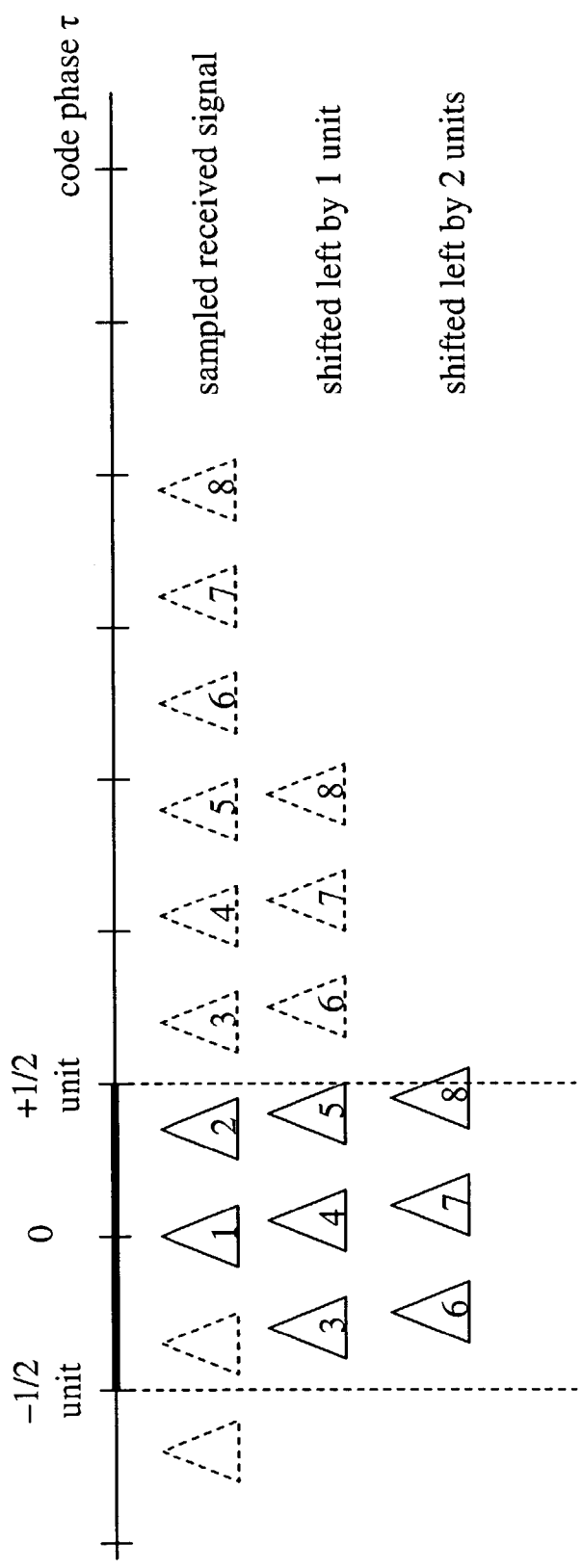
FIG. 4 illustrates a technique of code Doppler compensation.

FIG. 4 illustrates a technique for code Doppler compensation. In this technique, a code Doppler shift factor is received independently (e.g. from a determination of the Doppler shift of the carrier signal). At selected correction periods, the accumulated code Doppler shift is determined. The correction periods may correspond to code modulation periods, but any other period may also be used. If the magnitude of the shift amount exceeds one-half sample (alternatively, is not less than one-half sample), then the signal portion and successive portions are shifted by one sample in that direction. For example, such a shift may be accomplished by adding or removing one sample from a stored digital representation of the received signal.

Figure 5:
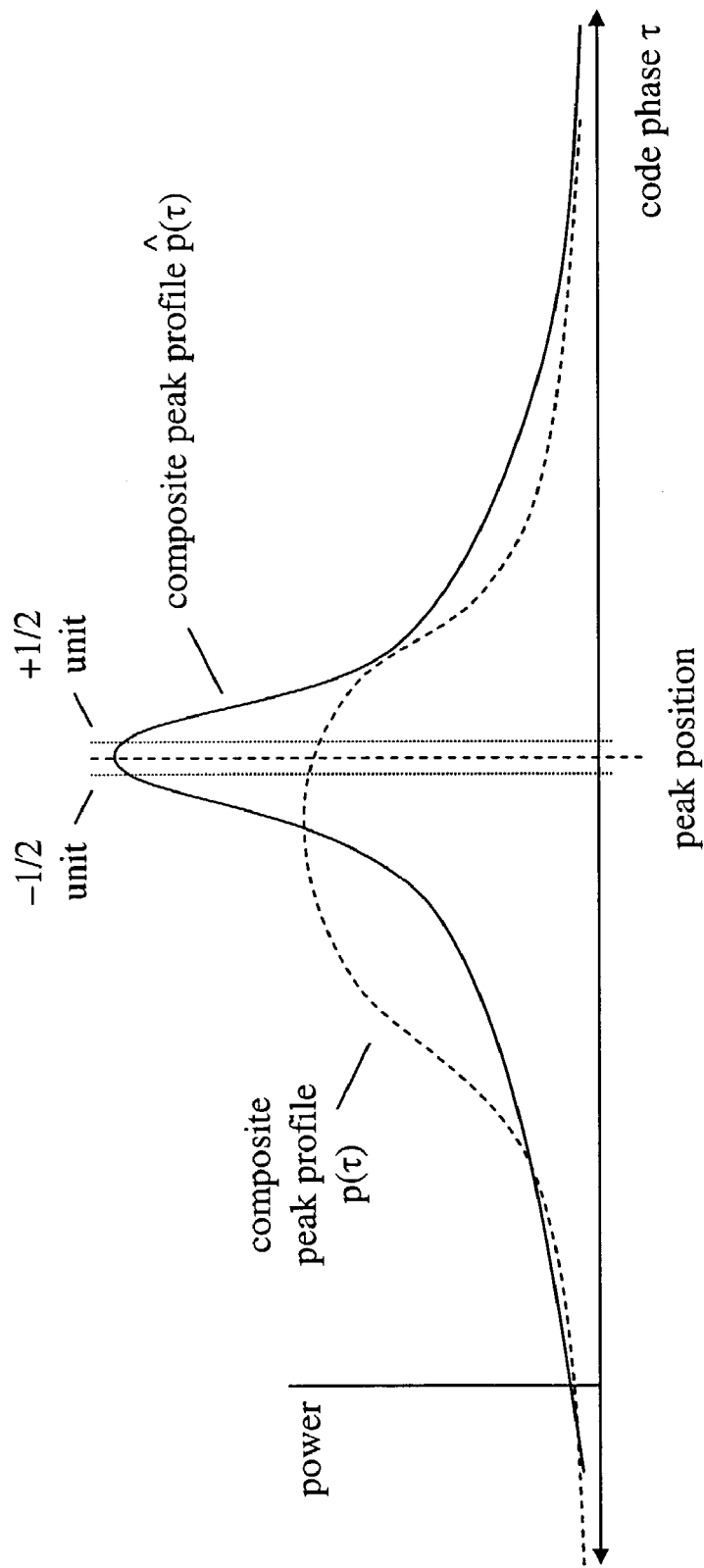
FIG. 5 illustrates an effect of code Doppler compensation on a composite peak profile.

FIG. 5 shows an example of a compensated composite peak profile $\hat{p}(\tau)$ as a function of code phase $\tau$. As compared to composite peak $p(\tau)$, the compensated peak may be more localized and have a greater magnitude, but may also be shifted in code phase. In one application, a position of the peak of the compensated profile is determined by performing an interpolation among the highest value and its neighbors (e.g. a quadratic interpolation among the highest value and its neighbor on each side) and selecting the peak position as the peak of the interpolated curve.

Shifting allows the peak to accumulate, and may lead to better localization; unfortunately, shifting makes the time base inaccurate. For example, an error of only ⅛ chip is equivalent to over 30 meters. It is, of course, desirable to correctly locate the peak.

In one implementation, the received signal is sampled at chip×8 (e.g. 8×1.2288 MHz for a GPS signal). The sampled signal is resampled to chip×2 and divided into two streams (e.g. on-time and late) for correlation as described herein.

Figure 6:
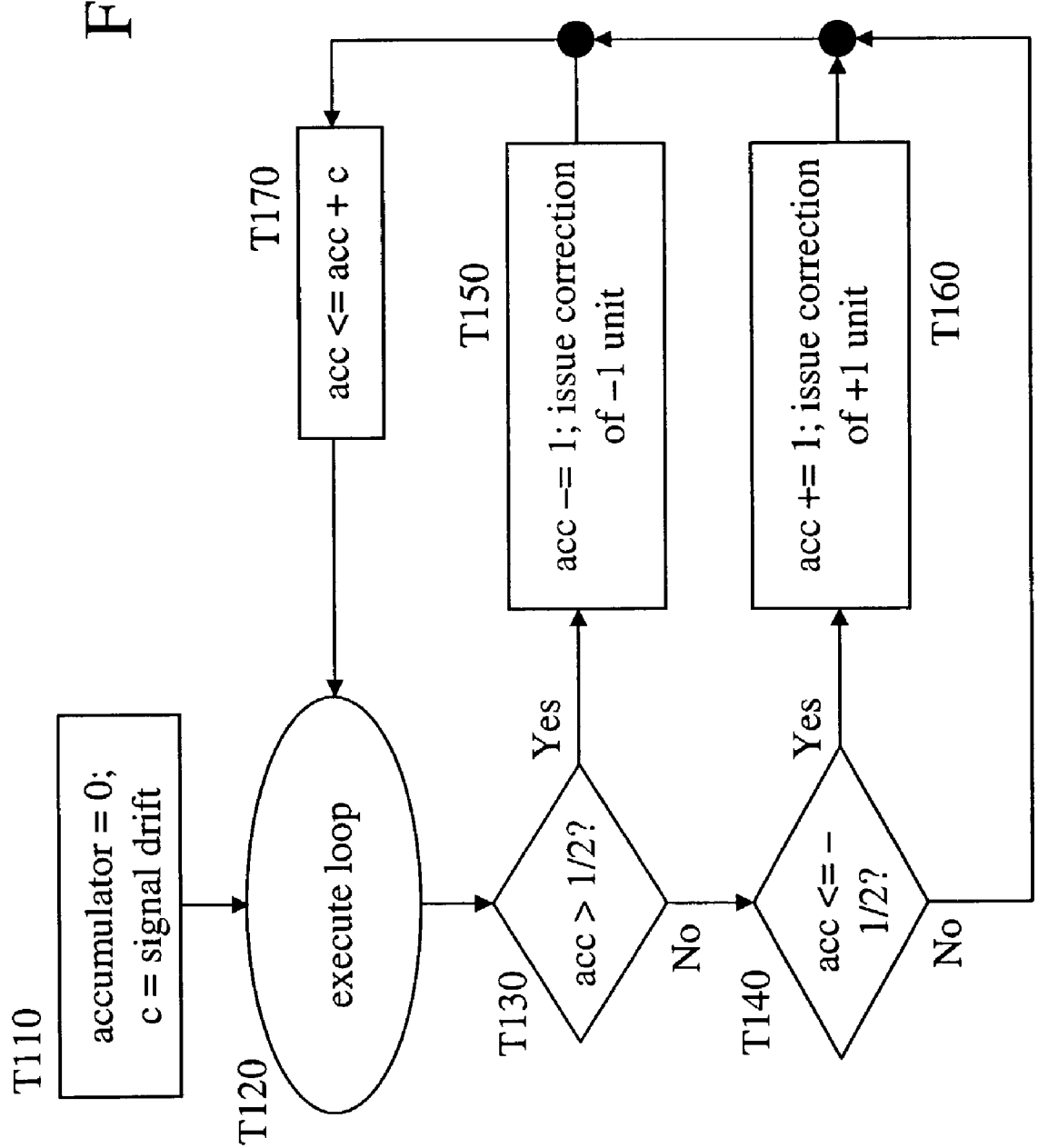
FIG. 6 shows a flowchart for a method of code Doppler compensation.

FIG. 6 shows a flowchart for a method of code Doppler compensation. Task T110 sets an accumulator to an initial value (e.g. zero). Task T110 also sets a value c to a predetermined signal drift value in correction units per execution period of loop T120-T170. In one example, the value c represents an estimated code Doppler shift that is determined from a measured Doppler frequency of the carrier signal. In a particular application, each correction unit is one sample, and the loop T120-T170 is executed once per correction period (e.g. code modulation period).

Tasks T130 and T140 determine relations between a current value of the accumulator and ½ of a correction unit. If task T130 determines that the current value exceeds ½ (alternatively, is not less than ½), then task T150 decrements the accumulator value and a correction of −1 unit is issued. Otherwise, if task T140 determines that the current value is not greater than −½ (alternatively, is less than −½), then task T160 increments the accumulator value and a correction of +1 unit is issued.

In one case, a correction having a magnitude of one unit is implemented by inserting or deleting one unit from the received signal before correlation. Alternatively, such a correction may be implemented by deleting or inserting one unit from the code sequence to be applied to the received signal.

Figure 7:
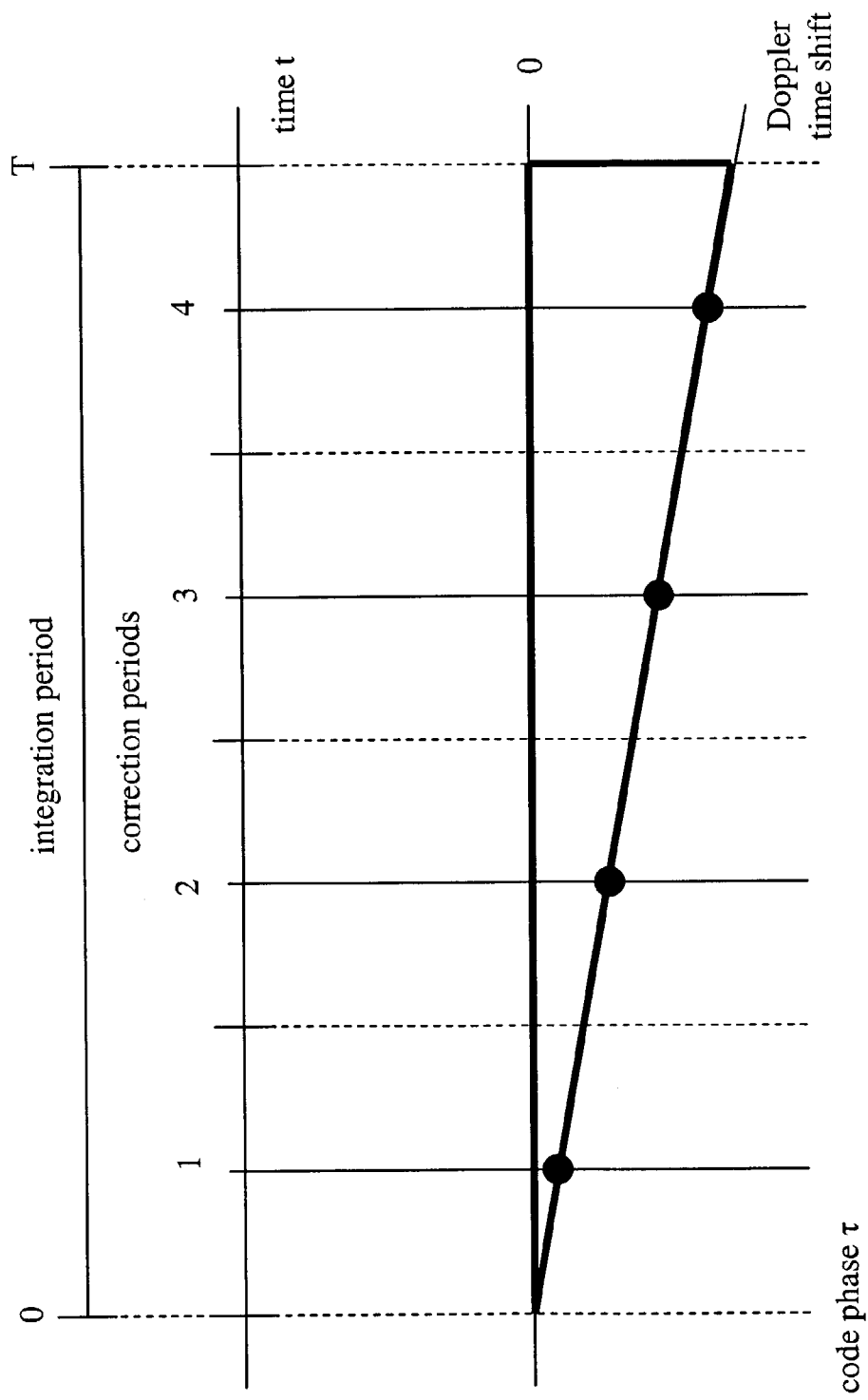
FIG. 7 illustrates the area under a Doppler time shift curve for an example as shown in FIG. 2.

FIG. 7 shows the example of FIG. 2 from a different perspective. In this illustration, the dots indicate the instantaneous peaks of the received signal at the midpoints of each correction period. The magnitude of the Doppler time shift of the peak of the composite profile, can be estimated to be the time average of the instantaneous peak position, i.e.

$$\frac{1}{T}\int_0^T c \cdot t$$

dt, where c is the rate of drift, and T is the time over which the integration is performed. This value is the area of the triangle outlined in bold, divided by the length of the base of the triangle. This value is equal to the position of the instantaneous peak at the middle of the integration period.

Figure 8:
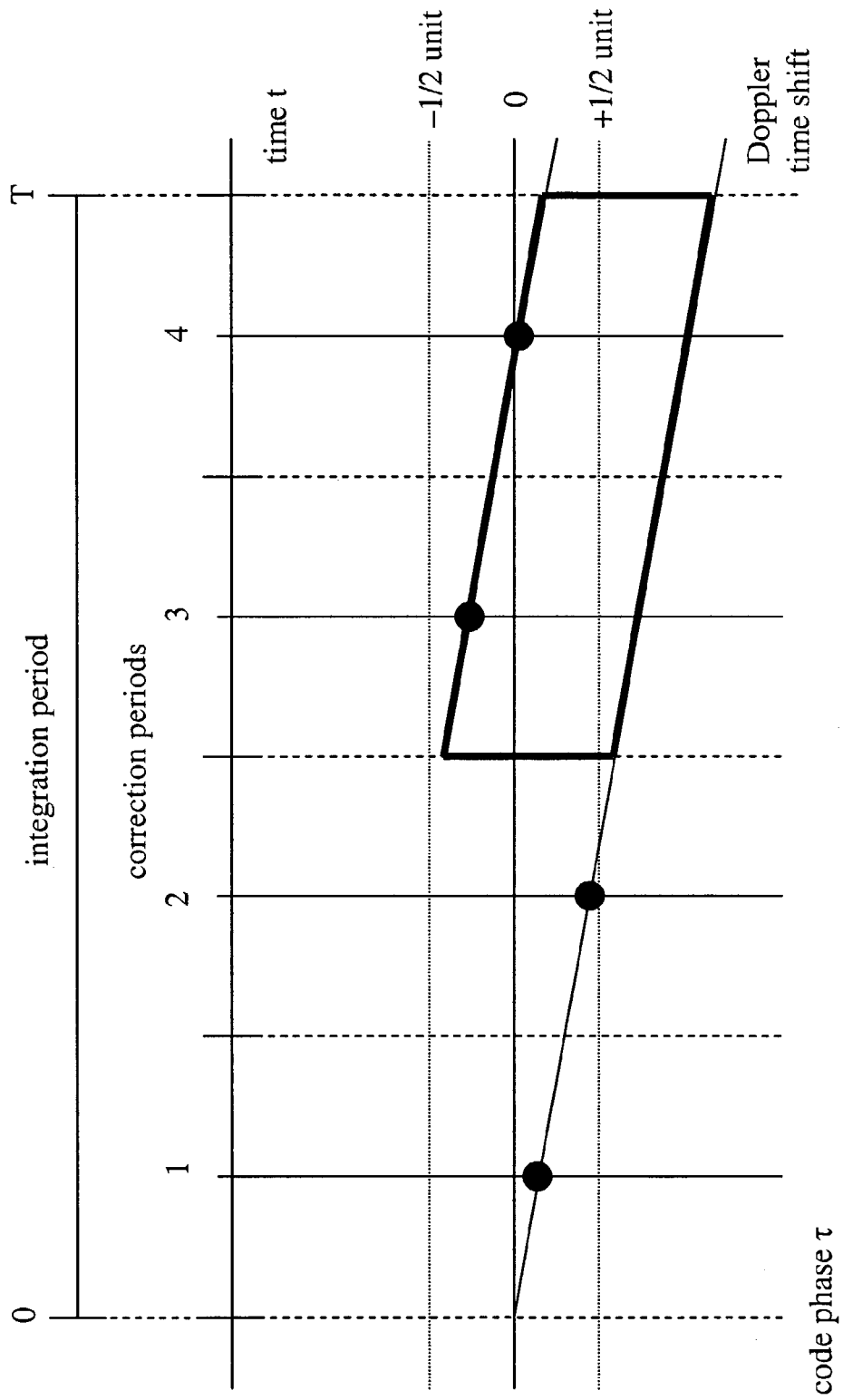
FIG. 8 illustrates an area corresponding to code Doppler compensation in application of a method as shown in FIG. 6 to an example as shown in FIG. 2.

FIG. 8 shows the example of FIG. 2 in a case where a compensation procedure as shown in FIG. 6 is applied. At the start of the third code modulation period, a compensation of one correction unit (e.g. one sample) is applied. The effect of this compensation on the composite peak profile is to narrow the spread of the composite peak profile. Further the composite peak position is shifted back by an amount that is the time averaged value of the compensation, i.e. the area outlined by the parallelogram in bold divided by the length of the base of the parallelogram. It may be understood that the parallelogram of this example has an area equal to one correction unit times two correction periods, while the base of the parallelogram has a length equal to two correction units.

As demonstrated in FIG. 5, a compensation procedure as shown in FIG. 6 may cause a change in the position of the peak of the composite signal (e.g. in a case where compensation is performed). It may be desired to calculate, from the position of a compensated peak $\hat{p}$, the drift of the received signal from an initial time to some other moment in time "t" (such moment may be within or outside of the integration period). Note that this is an estimate of the peak of the instantaneous profile of the signal, at the moment "t". Such a moment may be referred to as a timestamp.

In a case where the selected timestamp is the midpoint of the integration period, the drift of the received signal at that moment may be determined from the position of a compensated peak $\hat{p}$ by adding back the time averaged value of the compensation. In the example shown in FIGS. 7 and 8, such drift value may be determined by adding the area within the parallelogram divided by the base of the parallelogram, to the position of the compensated peak.

In the example shown in FIGS. 7 and 8, the Doppler shift is assumed to be zero at the start of the integration period. In another application, a compensation procedure as shown in FIG. 6 may execute independently of an integration procedure. For example, it may be desired to execute a compensation procedure essentially continuously, and to perform integration at selected times. In such cases, the values being integrated may have a code phase bias with respect to the corresponding signal as received. The bias value is the magnitude of the total number of corrections, applied before the start of integration.

Figure 9:
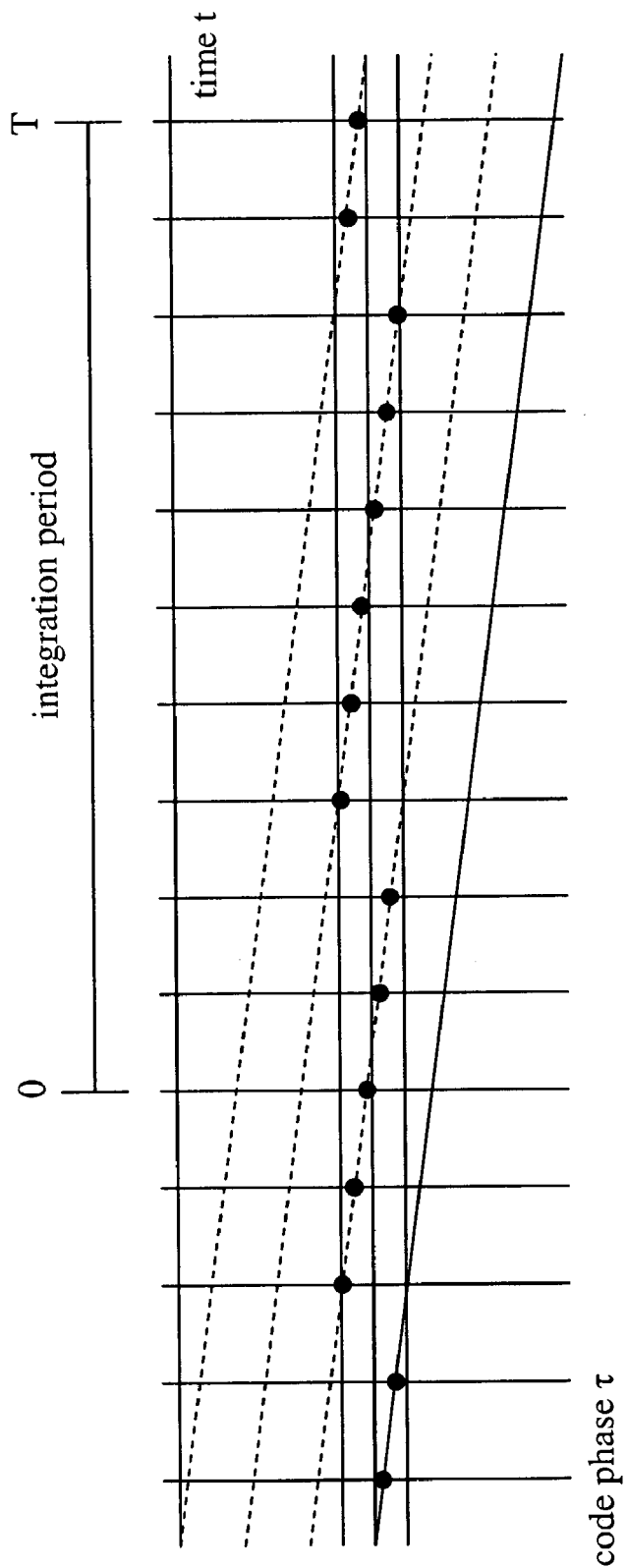
FIG. 9 illustrates another example of movement of a peak of a received signal over an integration period.
Figure 10:
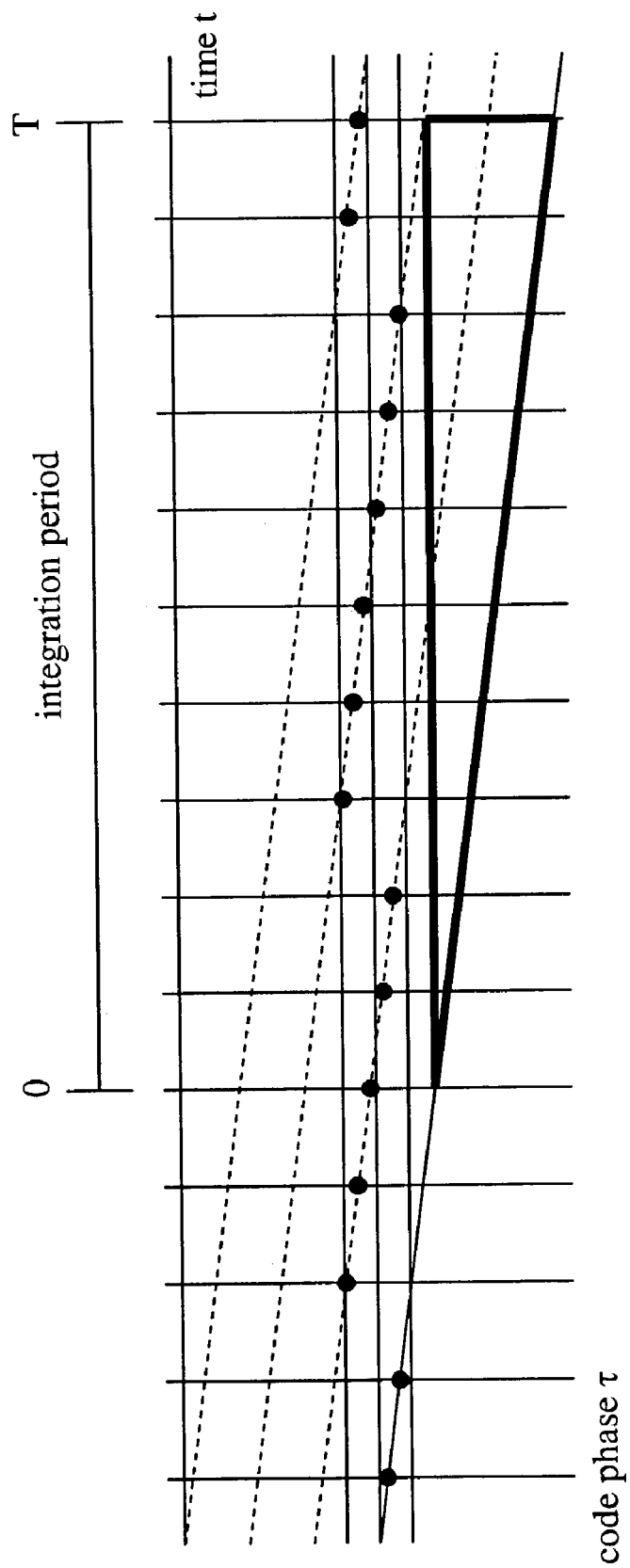
FIG. 10 illustrates the area under a Doppler time shift curve for an example as shown in FIG. 9.
Figure 11:
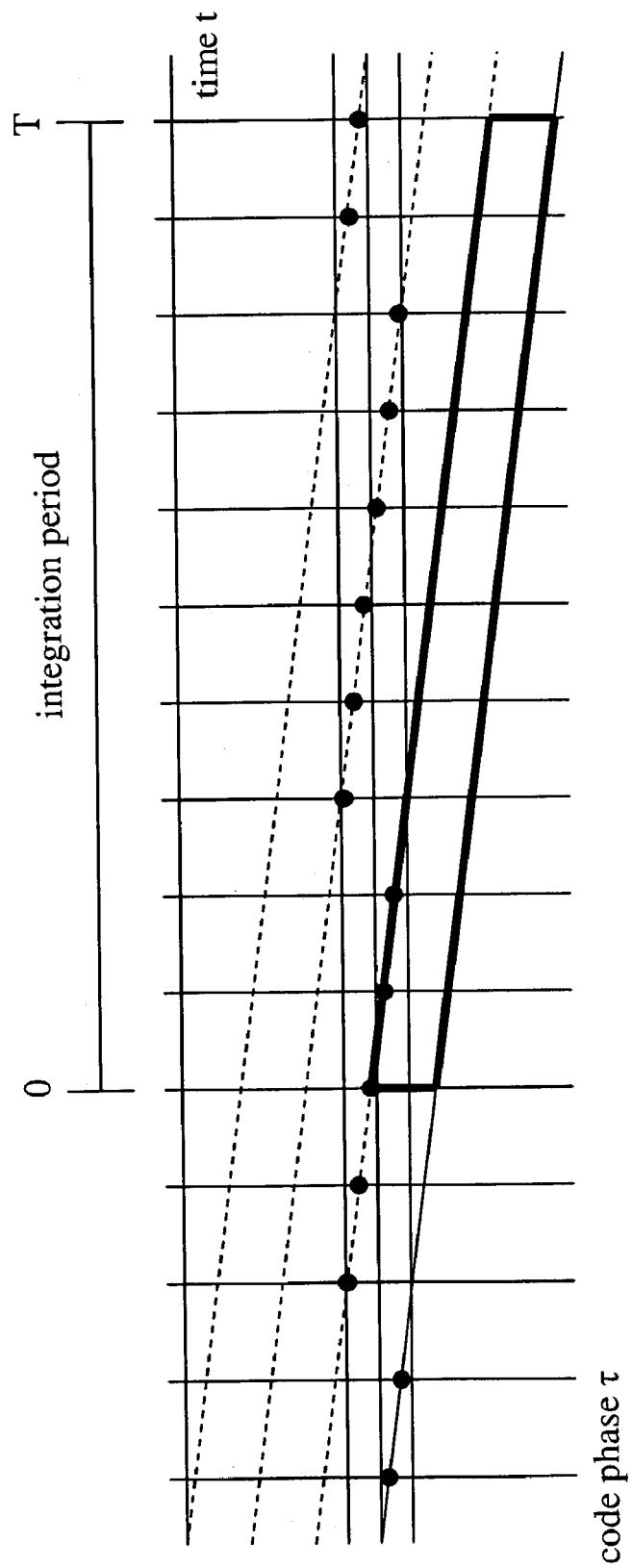
FIG. 11 illustrates an area corresponding to bias in an application of a method as shown in FIG. 6 to an example as shown in FIG. 9.
Figure 12:
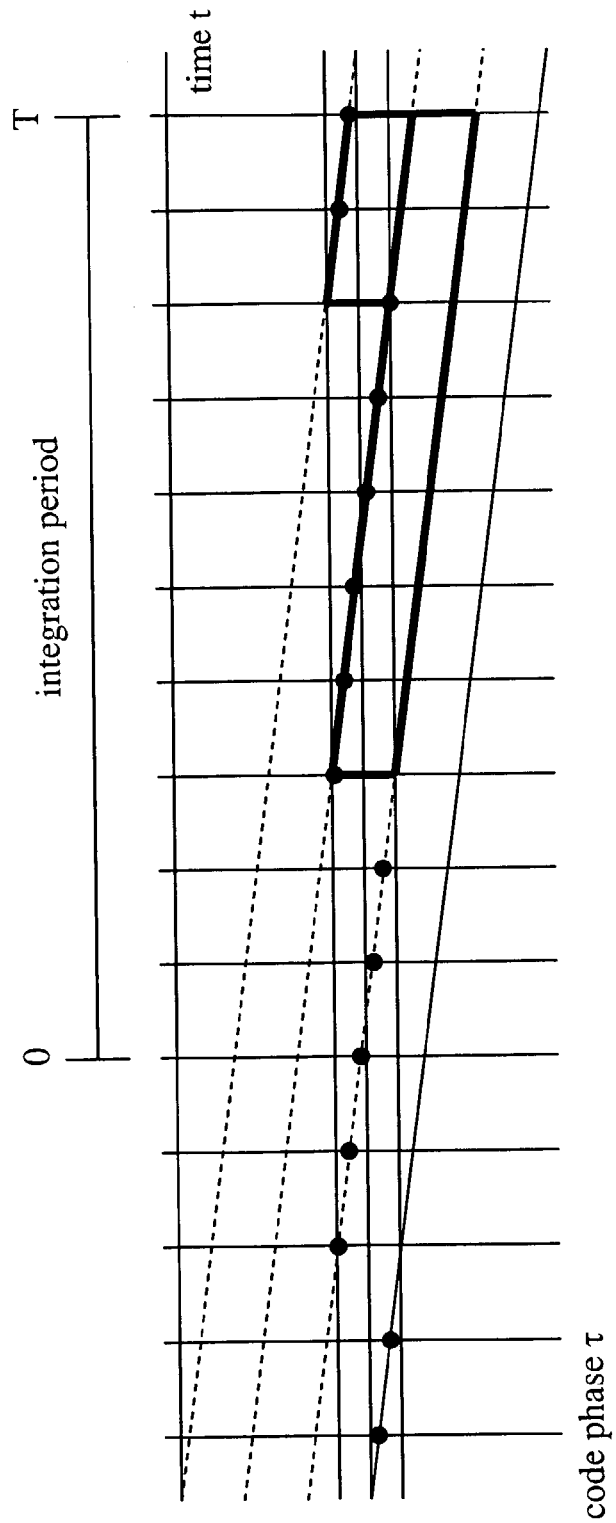
FIG. 12 illustrates an area corresponding to code Doppler compensation in an application of a method as shown in FIG. 6 to an example as shown in FIG. 9.

FIG. 9 shows another example in which a compensation procedure as shown in FIG. 6 is applied. In this example, compensation begins several code modulation periods before the integration period. In FIG. 10 the magnitude of the Doppler time shift of the peak of the composite profile is proportional to the area outlined by the triangle in bold. In FIG. 11, the area outlined by the parallelogram in bold is proportional to the magnitude of the bias of the peak of the composite profile due to compensation performed before the start of the integration period. It may be understood that the parallelogram of this example has an area equal to one correction unit times the integration period. The bias value then is one correction unit. In FIG. 12, the area outlined by the parallelograms in bold is proportional to the magnitude of the effect of the compensation on the location of the peak of the composite profile. In this case, for a timestamp at the midpoint of the integration period, both the magnitude of the bias and the compensation are added to the position of the observed (compensated) peak to determine the appropriate drift value.

In other applications, it may be desired to obtain a peak position for a timestamp at another point in time t. For example, a peak position for a timestamp at the start of the integration period may be calculated by adding the compensation (and any bias) to the position of the observed peak and also subtracting the time averaged value of the Doppler shift. (e.g. the area of the triangle divided by the length of the base in the examples of FIGS. 7 and 10). A peak position for a timestamp at the end of the integration period may be calculated by adding the compensation (and any bias) to the position of the observed peak and also adding the time averaged value due to the Doppler shift, i.e. the area under the Doppler shift curve divided by the length of the integration.

The estimate(s) upon which the Doppler shift curve is based may be erroneous. For example, factors such as oscillator drift may affect the accuracy of such a determination. One possible advantage of selecting a timestamp at the middle of the integration period is that the calculation of peak position need not include the area under the Doppler shift curve, which area will be affected by an error in the Doppler estimate. Therefore, a peak position as calculated for such a timestamp may be robust to at least minor errors in a Doppler estimate.

If there is an error in the estimate of the signal drift value, corrections may be applied by the compensation procedure as shown in FIG. 6 based on the estimated value of signal drift. The corrections may be derived from the estimated rate of Peak drift. The shift of the Peak value of the composite profile may be the time averaged value of the instantaneous peak position after the compensation is applied. The position of the instantaneous peak at the mid point of integration can be estimated by the sum of the position of the composite peak profile, the bias value due to any corrections applied before the start of integration and time averaged value of the Doppler compensation applied. Mathematically, $$p(t1) = \text{bias} + p_{cp} + \frac{1}{T}\int_0^T \tilde{c}(t) \cdot dt$$

where $p_{cp}$ is the position of the peak in the composite peak profile, $\tilde{c}(t)$ is the staircase function due to code Doppler compensations, and the bias is the magnitude sum of all compensations applied before the start of integration.

The foregoing presentation of the described embodiments is provided to enable any person skilled in the art to make or use the present invention. Various modifications to these embodiments are possible, and the generic principles presented herein may be applied to other embodiments as well.

For example, the invention may be implemented in part or in whole as a hard-wired circuit or as a circuit configuration fabricated into an application-specific integrated circuit. The invention may also be implemented in part or in whole as a firmware program loaded into non-volatile storage or a software program loaded from or into a data storage medium as machine-readable code, such code being instructions executable by an array of logic elements such as a microprocessor or other digital signal processing unit. Thus, the present invention is not intended to be limited to the embodiments shown above but rather is to be accorded the widest scope consistent with the principles and novel features disclosed in any fashion herein.

What is claimed is:

1. A method of signal reception to compensate for Doppler code shift comprising:
   receiving, by a receiver, an estimated code Doppler shift factor associated with a received signal;
   modifying information indicative of the received signal using correction information based on the estimated code Doppler shift factor to generate corrected received signal information;
   correlating the corrected received signal information with a generated code sequence to produce a correlation output;
   integrating the correlation output over an integration period to generate an output integration and compensated composite profile information indicative of a correlation strength as a function of code phase difference between the corrected received signal information and the generated code sequence;
   determining first peak position correction information indicative of a code phase difference corresponding to a maximum correlation power amount, the determining comprising interpolating between integrated peaks of the output integration;
   determining a peak drift correction in a code phase dimension using the correction information; and modifying the first peak position information based on the peak drift correction to determine second peak position information.

2. The method of claim 1, wherein the correction information comprises information indicative of one or more corrections during the integration period.

3. The method of claim 1, wherein the correction information comprises information indicative of one or more corrections prior to initiation of the integration period.

4. The method of claim 1, wherein modifying information indicative of the received signal using correction information based on the estimated code Doppler shift factor to generate corrected received signal information comprises adding or deleting one sample from a stored digital representation of the received signal based on an accumulated code Doppler shift amount.

5. The method of claim 1, wherein the second peak position information corresponds to a peak position at a particular timestamp $t_1$ included in the integration period.

6. The method of claim 5, wherein $t_1$ is the midpoint of the integration period.

7. The method of claim 5, wherein the second peak position information is used to determine a position of the receiver.

8. A method of signal reception to compensate for Doppler code shift comprising:
receiving, by a receiver, an estimated code Doppler shift factor associated with a received signal;
modifying information indicative of a generated code sequence using correction information based on the estimated code Doppler shift factor to generate a corrected generated code sequence;
correlating information indicative of the received signal with the corrected generated code sequence to produce a correlation output;
integrating the correlation output over an integration period to generate an output integration and compensated composite profile information indicative of a correlation strength as a function of code phase difference between the received signal and the corrected generated code sequence;
determining first peak position correction information indicative of a code phase difference corresponding to a maximum correlation power amount, the determining comprising interpolating between integrated peaks of the output integration;
determining a peak drift correction in a code phase dimension using the correction information; and
modifying the first peak position information based on the peak drift correction to determine second peak position information.

9. The method of claim 8, wherein the correction information comprises information indicative of one or more corrections during the integration period.

10. The method of claim 8, wherein the correction information comprises information indicative of one or more corrections prior to initiation of the integration period.

11. The method of claim 8, wherein modifying information indicative of a generated code sequence using correction information based on the estimated code Doppler shift factor to generate a corrected generated code sequence comprises adding or deleting one sample from a stored digital representation of the generated code sequence signal based on an accumulated code Doppler-shift amount.

12. The method of claim 8, wherein the second peak position information corresponds to a peak position at a particular timestamp $t_1$ included in the integration period.

13. The method of claim 12, wherein $t_1$ is the midpoint of the integration period.

14. The method of claim 12, wherein the second peak position information is used to determine a position of the receiver.

15. An apparatus comprising:
means for receiving an estimated Doppler shift factor associated with a received signal;
means for modifying information indicative of the received signal using correction information based on the estimated code Doppler shift factor to generate corrected received signal information;
means for correlating the corrected received signal information with a generated code sequence to produce a correlation output;
means for integrating the correlation output over an integration period to generate an output integration and compensated composite profile information indicative of a correlation strength as a function of code phase different between the corrected received signal information and the generated code sequence;
means for determining first peak position correction information indicative of a code phase difference corresponding to a maximum correlation power amount, the determining comprising interpolating between integrated peaks of the output integration;
means for determining a peak drift correction in a code phase dimension using the correction information; and
means for modifying the first peak position information based on the peak drift correction to determine second peak position information.

16. An apparatus comprising:
means for receiving an estimated code Doppler shift factor associated with a received signal;
means for modifying information indicative of a generated code sequence using correction information based on the estimated code Doppler shift factor to generate a corrected generated code sequence;
means for correlating information indicative of the received signal with the corrected generated code sequence to produce a correlation output;
means for integrating the correlation output over an integration period to generate an output integration and compensated composite profile information indicative of a correlation strength as a function of code phase difference between the received signal and the corrected generated code sequence;
means for determining first peak position correction information indicative of a code phase difference corresponding to a maximum correlation power amount, the determining comprising interpolating between integrated peaks of the output integration;
means for determining a peak drift correction in a code phase dimension using the correction information; and
means for modifying the first peak position information based on the peak drift correction to determine second peak position information.

17. An article comprising machine readable code stored in a data storage medium, the machine readable code including instructions to cause one or more machines to perform operations comprising:
receiving an estimated code Doppler shift factor associated with a received signal;
modifying information indicative of the received signal using correction information based on the estimated code Doppler shift factor to generate corrected received signal information;

correlating the corrected received signal information with a generated code sequence to produce a correlation output;

integrating the correlation output over an integration period to generate an output integration and compensated composite profile information indicative of a correlation strength as a function of code phase difference between the corrected received signal information and the generated code sequence;

determining first peak position correction information indicative of a code phase difference corresponding to a maximum correlation power amount, the determining comprising interpolating between integrated peaks of the output integration;

determining a peak drift correction in a code phase dimension using the correction information; and modifying the first peak position information based on the peak drift correction to determine second peak position information.

18. The article of claim 17, wherein the correction information comprises information indicative of one or more corrections during the integration period.

19. The article of claim 17, wherein the correction information comprises information indicative of one or more corrections prior to initiation of the integration period.

20. The article of claim 17, wherein modifying information indicative of the received signal using correction information based on the estimated code Doppler shift factor to generate corrected received signal information comprises adding or deleting one sample from a stored digital representation of the received signal based on an accumulated code Doppler shift amount.

21. The article of claim 17, wherein the second peak position information corresponds to a peak position at a particular timestamp $t_1$ included in the integration period.

22. The article of claim 21, wherein $t_1$ is the midpoint of the integration period.

23. The article of claim 21, wherein the second peak position information is used to determine a position of a receiver.

24. An article comprising machine readable code stored in a data storage medium, the machine readable code including instructions to cause one or more machines to perform operations comprising:

receiving an estimated code Doppler shift factor associated with a received signal;

modifying information indicative of a generated code sequence using correction information based on the estimated code Doppler shift factor to generate a corrected generated code sequence;

correlating information indicative of the received signal with the corrected generated code sequence to produce a correlation output;

integrating the correlation output over an integration period to generate an output integration and compensated composite profile information indicative of a correlation strength as a function of code phase difference between the received signal and the corrected generated code sequence;

determining first peak position correction information indicative of a code phase difference corresponding to a maximum correlation power amount, the determining comprising interpolating between integrated peaks of the output integration;

determining a peak drift correction in a code phase dimension using the correction information; and modifying the first peak position information based on the peak drift correction to determine second peak position information.

25. The article of claim 24, wherein the correction information comprises information indicative of one or more corrections during the integration period.

26. The article of claim 24, wherein the correction information comprises information indicative of one or more corrections prior to initiation of the integration period.

27. The article of claim 24, wherein modifying information indicative of a generated code sequence using correction information based on the estimated code Doppler shift factor to generate a corrected generated code sequence comprises adding or deleting one sample from a stored digital representation of the generated code sequence signal based on an accumulated code Doppler shift amount.

28. The article of claim 24, wherein the second peak position information corresponds to a peak position at a particular timestamp $t_1$ included in the integration period.

29. The article of claim 28, wherein $t_1$ is the midpoint of the integration period.

30. The article of claim 28, wherein the second peak position information is used to determine a position of a receiver.

31. A method of signal reception to compensate for Doppler code shift comprising:

receiving, by a receiver, an estimated code Doppler shift factor associated with a received signal;

modifying information indicative of the received signal using correction information based on the estimated code Doppler shift factor to generate corrected received signal information;

correlating the corrected received signal information with a generated code sequence to produce a correlation output;

integrating the correlation output over an integration period to generate an output integration and compensated composite profile information indicative of a correlation strength as a function of code phase difference between the corrected received signal information and the generated code sequence;

interpolating between integrated peaks of the integration of the correlation output to determine first peak position correction information indicative of a code phase difference corresponding to a maximum correlation power amount;

estimating a peak drift correction in a code phase dimension using the correction information; and modifying the first peak position information based on the peak drift correction to determine second peak position information.

32. The method of claim 31, wherein the correction information comprises information indicative of one or more corrections during the integration period.

33. The method of claim 31, wherein the correction information comprises information indicative of one or more corrections prior to initiation of the integration period.

34. The method of claim 31, wherein modifying information indicative of the received signal using correction information based on the estimated code Doppler shift factor to generate corrected received signal information comprises adding or deleting one sample from a stored digital representation of the received signal based on an accumulated code Doppler shift amount.

35. An apparatus comprising:

means for receiving an estimated Doppler shift factor associated with a received signal;

means for modifying information indicative of the received signal using correction information based on the estimated code Doppler shift factor to generate corrected received signal information;

means for correlating the corrected received signal information with a generated code sequence to produce a correlation output;

means for integrating the correlation output over an integration period to generate an output integration and compensated composite profile information indicative of a correlation strength as a function of code phase difference between the corrected received signal information and the generated code sequence;

means for interpolating between integrated peaks of the integration of the correlation output to determine first peak position correction information indicative of a code phase difference corresponding to a maximum correlation power amount;

means for estimating a peak drift correction in a code phase dimension using the correction information; and means for modifying the first peak position information based on the peak drift correction to determine second peak position information.

36. The method of claim 35, wherein the means for modifying information is adapted to generate corrected received signal information by adding or deleting one sample from a stored digital representation of the received signal based on an accumulated code Doppler shift amount.

37. An article comprising machine readable code stored in a data storage medium, the machine readable code including instructions which, if executed by a digital signal processing unit are adapted to direct the digital signal processing unit to:

receive an estimated code Doppler shift factor associated with a received signal;

modify information indicative of the received signal using correction information based on the estimated code Doppler shift factor to generate corrected received signal information;

correlate the corrected received signal information with a generated code sequence to produce a correlation output;

integrate the correlation output over an integration period to generate an output integration and compensated composite profile information indicative of a correlation strength as a function of code phase difference between the corrected received signal information and the generated code sequence;

interpolate between integrated peaks of the integration of the correlation output to determine first peak position correction information indicative of a code phase difference corresponding to a maximum correlation power amount;

estimate a peak drift correction in a code phase dimension using the correction information; and modify the first peak position information based on the peak drift correction to determine second peak position information.

38. The article of claim 37 wherein the instructions, if executed by the digital signal processing unit, are further adapted to direct the digital signal processing unit to generate corrected received signal information by adding or deleting one sample from a stored digital representation of the received signal based on an accumulated code Doppler shift amount.

* * * * *

UNITED STATES PATENT AND TRADEMARK OFFICE
CERTIFICATE OF CORRECTION

PATENT NO. : 7,596,190 B2 Page 1 of 1
APPLICATION NO. : 10/404715
DATED : September 29, 2009
INVENTOR(S) : Patrick et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 962 days.

Signed and Sealed this

Twenty-eighth Day of September, 2010

David J. Kappos
*Director of the United States Patent and Trademark Office*